United States Patent
Liang (10) Patent No.: US 10,122,618 B2
(45) Date of Patent: Nov. 6, 2018

(54) PATH SWITCHING METHOD AND DEVICE

(71) Applicant: Huawei Technologies Co., Ltd., Shenzhen (CN)

(72) Inventor: Jianyao Liang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 93 days.

(21) Appl. No.: 15/345,818

(22) Filed: Nov. 8, 2016

(65) Prior Publication Data
US 2017/0054630 A1    Feb. 23, 2017

Related U.S. Application Data

(63) Continuation of application No. PCT/CN2014/077184, filed on May 9, 2014.

(51) Int. Cl.
*H04L 12/707* (2013.01)
*H04L 12/703* (2013.01)
*H04L 12/715* (2013.01)

(52) U.S. Cl.
CPC .............. *H04L 45/22* (2013.01); *H04L 45/28* (2013.01); *H04L 45/64* (2013.01)

(58) Field of Classification Search
None
See application file for complete search history.

(56) References Cited

U.S. PATENT DOCUMENTS

| 9,548,933 | B2* | 1/2017 | Murakami | H04L 47/20 |
| 2014/0050078 | A1* | 2/2014 | Sato | H04L 41/0654 370/228 |
| 2015/0009798 | A1* | 1/2015 | Yoshida | H04L 41/0654 370/216 |

FOREIGN PATENT DOCUMENTS

| CN | 101645848 A | 2/2010 |
| CN | 101998191 A | 3/2011 |
| CN | 102957559 A | 3/2013 |
| WO | 2012004843 A1 | 1/2012 |

OTHER PUBLICATIONS

Sgambelluri, A., et al., "Effective Flow Protection in OpenFlow Rings," Optical Society of America, OFC/NFOEC Technical Digest, 2013, 3 pages.
"OpenFlow Switch Specification," Version 1.3.4, (Protocol Version 0x04), Mar. 27, 2014, 171 pages.
(Continued)

*Primary Examiner* — Hong Cho
(74) *Attorney, Agent, or Firm* — Conley Rose, P.C.

(57) ABSTRACT

A path switching method and a device, including determining, by a controller, an active path and at least one standby path of a data flow, and delivering a flow table to a standby path switch such that after the data flow is switched from the active path to the standby path, the standby path switch forwards the data flow according to the flow table, and delivering, by the controller, a path group table to each failover switch, where the path group table includes an identifier of the active path and standby port information such that when detecting, according to the identifier of the active path, that the active path encounters a failure, each failover switch performs path switching according to the standby port information.

14 Claims, 3 Drawing Sheets

(56) References Cited

OTHER PUBLICATIONS

"OpenFlow Switch Specification," ONF TS-002, Version 1.1.0, Implemented (Wire Protocol 0x02), Feb. 28, 2011, 58 pages.
Foreign Communication From a Counterpart Application, European Application No. 14891491.4, Extended European Search Report dated Apr. 20, 2017, 9 pages.
Foreign Communication From a Counterpart Application, PCT Application No. PCT/CN2014/077184, English Translation of International Search Report dated Feb. 17, 2015, 2 pages.
Foreign Communication From a Counterpart Application, PCT Application No. PCT/CN2014/077184, English Translation of Written Opinion dated Feb. 17, 2015, 6 pages.

\* cited by examiner

PATH SWITCHING METHOD AND DEVICE

CROSS-REFERENCE TO RELATED APPLICATIONS

This application is a continuation of International Application No. PCT/CN2014/077184, filed on May 9, 2014, the disclosure of which is hereby incorporated by reference in its entirety.

TECHNICAL FIELD

Embodiments of the present disclosure relate to the communications technologies, and in particular, to a path switching method and a path switching device.

BACKGROUND

A software defined network (SDN) is a new-type network architecture. In a core technology OPENFLOW of the SDN, a control plane and a data plane of a network device are separated, thereby implementing flexible control of network traffic.

In the OPENFLOW protocol, the switch may accomplish a failover using a fast failover group table when a port of a switch encounters a failure. There are n transmit ports which are used with active/active clustering and are saved in the group table of the switch. The switch detects statuses of the n ports in real time. The switch switches a transmit port from the active port to a standby port and sends a data packet using the standby port when detecting that an active port encounters a failure.

Figure 1:
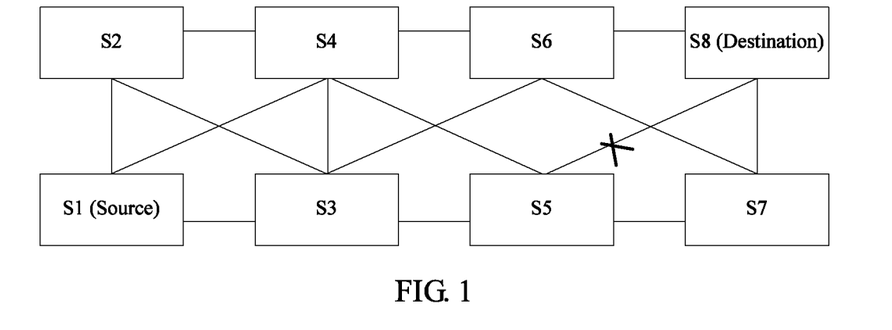
FIG. 1 is a schematic structural diagram of a network topology.

However, in the solution in the prior art, each switch can detect an electric failure of only a respective port. After a path in a network encounters a failure, OPENFLOW does not provide a corresponding solution. As shown in FIG. 1, FIG. 1 is a schematic structural diagram of a network topology. The network topology includes 8 switches, which are S1, S2, S3, S4, S5, S6, S7, and S8. Fast switching to another communication path needs to be performed when a failure occurs between S5 and S8 on a communication path S1→S3→S5→S8. However, OPENFLOW does not provide a corresponding solution, and communication interruption occurs.

SUMMARY

Embodiments of the present disclosure provide a path switching method and a device such that a path failure can be detected, and when a path failure is detected, switching from a current path to a standby path is performed in time, thereby avoiding communication interruption.

A first aspect of the present disclosure provides a path switching method, including determining, by a controller, an active path and at least one standby path of a data flow, where the active path and the standby path have a same source switch and a same destination switch, delivering, by the controller, a flow table to a standby path switch, where the standby path switch is on the standby path and is not on the active path such that after the data flow is switched from the active path to the standby path, the standby path switch forwards the data flow according to the flow table, where the flow table includes an indication indicating that there is no hit of a flow entry in the flow table and the flow table is still not to be deleted, and delivering, by the controller, a path group table to each failover switch, where the path group table includes an identifier of the active path and standby port information such that when detecting, according to the identifier of the active path, that the active path encounters a failure, each failover switch performs path switching according to the standby port information, where the failover switch is a switch that is on the active path and that is on any path of the standby path, the failover switch is not the destination switch, the failover switch has at least one standby port, an active port of the failover switch corresponds to the active path, and each standby port of the failover switch corresponds to one standby path.

With reference to the first aspect of the present disclosure, in a first possible implementation manner of the first aspect of the present disclosure, the indication indicating that there is no hit of a flow entry in the flow table and the flow table is still not to be deleted includes that a hard time-out and an idle time-out of the flow table are both set to 0.

With reference to the first aspect of the present disclosure or the first possible implementation manner of the first aspect of the present disclosure, in a second possible implementation manner of the first aspect of the present disclosure, after delivering, by the controller, a path group table to each failover switch, the method further includes sending, by the controller, a test instruction packet to the source switch, to instruct each failover switch on the active path to detect whether the active path encounters a failure.

With reference to the second possible implementation manner of the first aspect of the present disclosure, in a third possible implementation manner of the first aspect of the present disclosure, the test instruction packet includes the identifier of the active path, a detection period, and a failure determining period quantity M.

A second aspect of the present disclosure provides a path switching method, where the path switching method is executed by a failover switch, the failover switch is a switch that is on an active path and that is on any standby path of the active path, the active path and the standby path have a same source switch and a same destination switch, the failover switch has at least one standby port, an active port of the failover switch corresponds to the active path, each standby port of the failover switch corresponds to one standby path, and the method includes receiving, by the failover switch, a path group table delivered by a controller, where the path group table includes an identifier of the active path, and detecting, by the failover switch according to a received failure detection message and the received path group table, whether the active path encounters a failure.

With reference to the second aspect of the present disclosure, in a first possible implementation manner of the second aspect of the present disclosure, when the failover switch is not the source switch, detecting, by the failover switch according to a received failure detection message and the received path group table, whether the active path encounters a failure includes receiving, by the failover switch within M detection periods, at least one detection packet sent by an adjacent upstream failover switch on the active path, where the detection packet carries the identifier of the active path, a detection period, and a failure determining period quantity M, sending, by the failover switch, a detection response packet to the adjacent upstream failover switch according to the identifier of the active path and forwarding the detection packet to an adjacent downstream failover switch on the active path or the destination switch on the active path, and determining, by the failover switch, that the active path encounters a failure if the failover switch does not receive, within the M detection periods, a detection response packet returned by the adjacent downstream failover switch or the destination switch, where M is a positive integer greater than or equal to 1.

With reference to the second aspect of the present disclosure, in a second possible implementation manner of the second aspect of the present disclosure, when the failover switch is the source switch, detecting, by the failover switch according to a received failure detection message and the received path group table, whether the active path encounters a failure includes receiving, by the failover switch, a test instruction packet sent by the controller, where the test instruction packet includes the identifier of the active path, a detection period, and a failure determining period quantity M, where M is a positive integer greater than or equal to 1, sending, by the failover switch, a detection packet to an adjacent downstream failover switch within each detection period according to the identifier of the active path, where the detection packet carries the identifier of the active path, the detection period, and the failure determining period quantity M such that the adjacent downstream failover switch on the active path forwards the detection packet according to the identifier of the active path, and determining, by the failover switch, that the active path encounters a failure if the failover switch does not receive, within M detection periods, a detection response packet returned by the adjacent downstream failover switch or the destination switch.

With reference to the first or second possible implementation manner of the second aspect of the present disclosure, in a third possible implementation manner of the second aspect of the present disclosure, the path group table further includes standby port information of the failover switch, and the method further includes performing, by the failover switch, path switching according to the standby port information when detecting that the active path encounters a failure.

With reference to the third possible implementation manner of the second aspect of the present disclosure, in a fourth possible implementation manner of the second aspect of the present disclosure, the performing path switching according to the standby port information includes selecting, by the failover switch, a destination standby port according to the standby port information, and switching a transmit port from the active port to the destination standby port, to accomplish switching of a data flow from the active path to a standby path corresponding to the destination standby port.

With reference to the second aspect of the present disclosure, in a fifth possible implementation manner of the second aspect of the present disclosure, when the failover switch is not the source switch, detecting, by the failover switch according to a received failure detection message and the received path group table, whether the active path encounters a failure includes determining, by the failover switch, that the active path encounters a failure if the failover switch does not receive, within M detection periods, a detection packet sent by an adjacent upstream failover switch, and does not receive, within the M detection periods, a detection response packet returned by an adjacent downstream failover switch or the destination switch, where M is a positive integer greater than or equal to 1, and the detection packet carries the identifier of the active path, a detection period, and a failure determining period quantity M such that switches on the active path forward the detection packet according to the identifier of the active path.

With reference to the fifth possible implementation manner of the second aspect of the present disclosure, in a sixth possible implementation manner of the second aspect of the present disclosure, the method further includes skipping, by the failover switch, performing path switching.

A third aspect of the present disclosure provides a controller, including a path determining module configured to determine an active path and at least one standby path of a data flow, where the active path and the standby path have a same source switch and a same destination switch, a flow table delivering module configured to deliver a flow table to a standby path switch, where the standby path switch is on the standby path and is not on the active path such that after the data flow is switched from the active path to the standby path, the standby path switch forwards the data flow according to the flow table, where the flow table includes an indication indicating that there is no hit of a flow entry in the flow table and the flow table is still not to be deleted; a determining module configured to determine a failover switch according to the conditions, the failover switch is on the active path and is on any path of the standby path, the failover switch is not the destination switch, the failover switch has at least one standby port, an active port of the failover switch corresponds to the active path, and each standby port of the failover switch corresponds to one standby path, and a path group table delivering module configured to deliver a path group table to each failover switch, where the path group table includes an identifier of the active path and standby port information such that when detecting, according to the identifier of the active path, that the active path encounters a failure, each failover switch performs path switching according to the standby port information.

With reference to the third aspect of the present disclosure, in a first possible implementation manner of the third aspect of the present disclosure, the indication indicating that there is no hit of a flow entry in the flow table and the flow table is still not to be deleted includes that a hard time-out and an idle time-out of the flow table are both set to 0.

With reference to the third aspect of the present disclosure and the first possible implementation manner of the third aspect of the present disclosure, in a second possible implementation manner of the third aspect of the present disclosure, the controller further includes a sending module configured to send a test instruction packet to the source switch, to instruct each failover switch on the active path to detect whether the active path encounters a failure.

With reference to the second possible implementation manner of the third aspect of the present disclosure, in a third possible implementation manner of the third aspect of the present disclosure, the test instruction packet includes the identifier of the active path, a detection period, and a failure determining period quantity M.

A fourth aspect of the present disclosure provides a failover switch, the failover switch is a switch that is on an active path and that is on any standby path of the active path, the active path and the standby path have a same source switch and a same destination switch, the failover switch has at least one standby port, an active port of the failover switch corresponds to the active path, each standby port of the failover switch corresponds to one standby path, and the failover switch includes a receiving module configured to receive a path group table delivered by a controller, where the path group table includes an identifier of the active path, and a failure detection module configured to detect, according to a received failure detection message and the received path group table, whether the active path encounters a failure.

With reference to the fourth aspect of the present disclosure, in a first possible implementation manner of the fourth aspect of the present disclosure, when the failover switch is not the source switch, the receiving module is further configured to receive a detection packet sent by an adjacent upstream failover switch, and receive a detection response packet returned by an adjacent downstream failover switch on the active path or the destination switch on the active path, where the detection packet carries the identifier of the active path, a detection period, and a failure determining period quantity M. The failover switch further includes a sending module configured to forward the detection packet to the adjacent downstream failover switch according to the identifier of the active path, and the failure detection module is further configured to determine that the active path encounters a failure if the receiving module receives, within M detection periods, at least one detection packet sent by an adjacent upstream failover switch on the active path, but does not receive, within the M detection periods, a detection response packet returned by the adjacent downstream failover switch or the destination switch, where M is a positive integer greater than or equal to 1.

With reference to the fourth aspect of the present disclosure, in a second possible implementation manner of the fourth aspect of the present disclosure, when the failover switch is the source switch, the receiving module is further configured to receive a test instruction packet sent by the controller, and a detection response packet returned by an adjacent downstream failover switch or the destination switch, where the test instruction packet includes the identifier of the active path, a detection period, and a failure determining period quantity M, where M is a positive integer greater than or equal to 1. The failover switch further includes a sending module configured to send a detection packet to the adjacent downstream failover switch within each detection period according to the identifier of the active path, where the detection packet carries the identifier of the active path, the detection period, and the failure determining period quantity M. The failure detection module is further configured to determine that the active path encounters a failure if the receiving module does not receive, within M detection periods, a detection response packet returned by the adjacent downstream failover switch or the destination switch.

With reference to the first or second possible implementation manner of the fourth aspect of the present disclosure, in a third possible implementation manner of the fourth aspect of the present disclosure, the path group table further includes standby port information of the failover switch, and the failover switch further includes a path switching module configured to perform path switching according to the standby port information when the failure detection module detects that the active path encounters a failure.

With reference to the third possible implementation manner of the fourth aspect of the present disclosure, in a fourth possible implementation manner of the fourth aspect of the present disclosure, the path switching module is further configured to select a destination standby port according to the standby port information, and switch a transmit port from the active port to the destination standby port, to accomplish switching of a data flow from the active path to a standby path corresponding to the destination standby port.

With reference to the fourth aspect of the present disclosure, in a fifth possible implementation manner of the fourth aspect of the present disclosure, when the failover switch is not the source switch, the receiving module is further configured to receive a detection packet sent by an adjacent upstream failover switch on the active path, and receive a detection response packet returned by an adjacent downstream failover switch on the active path or the destination switch on the active path, where the detection packet carries the identifier of the active path, a detection period, and a failure determining period quantity M such that switches on the active path forward the detection packet according to the identifier of the active path, and the failure detection module is further configured to determine, by the failover switch, that the active path encounters a failure if the receiving module does not receive, within M detection periods, the detection packet sent by the adjacent upstream failover switch, and does not receive, within the M detection periods, a detection response packet returned by the adjacent downstream failover switch or the destination switch, where M is a positive integer greater than or equal to 1.

With reference to the fifth possible implementation manner of the fourth aspect of the present disclosure, in a sixth possible implementation manner of the fourth aspect of the present disclosure, the failover switch further includes a path switching module configured to skip performing path switching when the failure detection module detects that the active path encounters a failure.

In the path switching method and the device in the embodiments of the present disclosure, a controller determines an active path and at least one standby path for a data flow, and determines at least one failover switch from switches other than a destination switch of the active path and the standby path, and the controller delivers a path group table to each failover switch, where the path group table includes an identifier of the active path and standby port information of the failover switch such that when detecting, according to the path group table, that the active path encounters a failure, the failover switch switches a transmit port from an active port to a standby port, to accomplish switching from the active path to the standby path, thereby avoiding communication interruption.

BRIEF DESCRIPTION OF DRAWINGS

To describe the technical solutions in the embodiments of the present disclosure or in the prior art more clearly, the following briefly describes the accompanying drawings required for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 2:
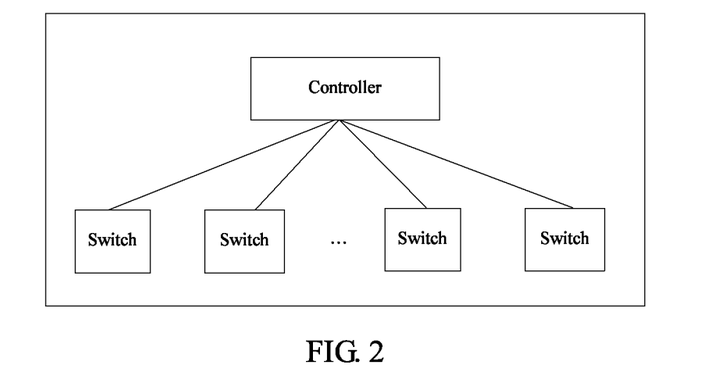
FIG. 2 is a schematic diagram of an architecture of a physical network of an SDN.

The path switching method according to an embodiment of the present disclosure is applicable to an SDN, and a core technology of the SDN is the OPENFLOW protocol. The OPENFLOW protocol runs on a physical network of the SDN. FIG. 2 is a schematic diagram of an architecture of a physical network of an SDN. As shown in FIG. 2, the physical network includes one controller and multiple OPENFLOW switches. The controller performs centralized control on the network. The controller delivers flow tables to switches, and manages the flow tables on the switches in a centralized manner to implement centralized management on the entire network. The switches are mainly configured to forward data according to the flow tables delivered by the controller, and the switches may also communicate with each other (not shown in the figure). In actual networking, the physical network may also include multiple controllers, and FIG. 2 shows only the simplest network architecture. In addition to the flow tables, some group tables, for example, a failover group table, are further defined in the OPENFLOW protocol, n output ports which are used with active/active clustering and are stored in the failover group table. A switch detects link states of the n ports in real time. In a normal case, the switch forwards a data packet from an active port. The switch selects a port in a normal state to forward a data packet when the active port encounters a link failure.

However, the failover group table can be used to detect only an electric failure on a network interface. After a path in a network is disconnected, a corresponding solution is not provided in the existing OPENFLOW protocol. Therefore, an embodiment of the present disclosure provides a path switching method. In a solution of this embodiment of the present disclosure, a controller determines an active path and at least one standby path for a data flow, and delivers a flow table to a standby path switch on the standby path. Different from a flow table on the active path, the flow table of the standby path switch includes an indication indicating that there is no hit in the flow table and the flow table is still not to be deleted in order to ensure that after the data flow is switched from the active path to the standby path, the standby path switch can forward data according to the flow table. In addition, an embodiment of the present disclosure further newly defines a path group table, where the path group table includes an identifier of an active path to be detected and standby port information such that when detecting, according to the path group table, that the active path encounters a failure, each failover switch performs path switching according to the path group table. The following describes the solution in the embodiments of the present disclosure in detail with reference to the accompanying drawings.

Figure 3:
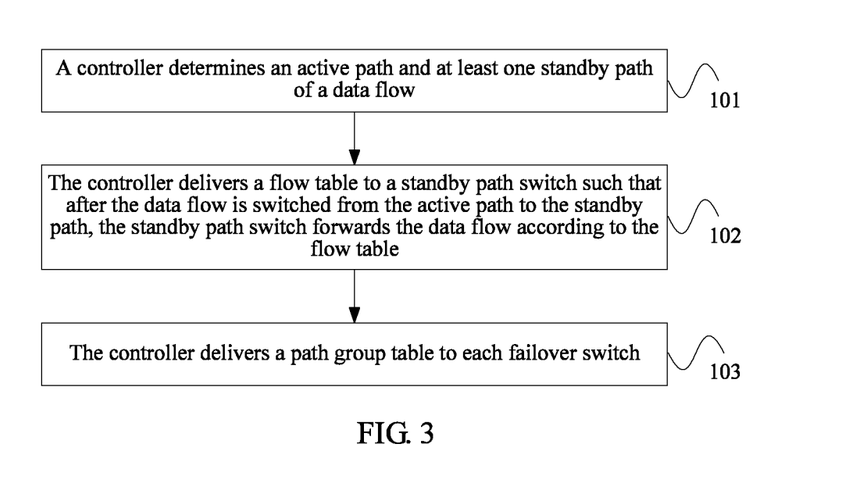
FIG. 3 is a flowchart of Embodiment 1 of a path switching method according to the present disclosure.

FIG. 3 is a flowchart of Embodiment 1 of a path switching method according to the present disclosure. As shown in FIG. 3, the method in this embodiment may include the following steps.

Step 101: A controller determines an active path and at least one standby path of a data flow.

The controller determines an active path and at least one standby path for the data flow. In a normal case, the data flow is transmitted using the active path, and the data flow is then transmitted using the standby path when a failure occurs on the active path, where the active path and the standby path have a same source switch and a same destination switch.

Step 102: The controller delivers a flow table to a standby path switch such that after the data flow is switched from the active path to the standby path, the standby path switch forwards the data flow according to the flow table.

After selecting a standby path for the data flow, the controller delivers the flow table to a standby path switch on the standby path such that after the data flow is switched from the active path to the standby path, the standby path switch forwards the data flow according to the flow table, where the standby path switch is on the standby path and is not on the active path, and the flow table includes an indication indicating that there is no hit of a flow entry in the flow table and the flow table is still not to be deleted. In a specific implementation manner, the indication indicating that there is no hit of a flow entry in the flow table and the flow table is still not to be deleted includes that a hard time-out and an idle time-out of the flow table are both set to 0.

In a conventional forward mechanism, each flow table includes a hard-time-out and an idle-time-out, and usually neither idle-time-out nor hard-time-out has a value of zero. A switch automatically deletes the flow table when there is no hit in the flow table within an idle-time-out. Regardless of whether there is a hit in the flow table, a switch deletes the flow table when a hard-time-out of the flow table is reached. In this embodiment of the present disclosure, when an idle-time-out=0 and a hard-idle-time=0, it indicates that there is no hit in a flow table and the flow table is still not to be deleted, and the flow table stays saved on a switch in order to ensure that when an active path encounters a failure and after a data flow is switched to a standby path, a standby path switch on the standby path can use the flow table to forward the data flow.

Step 103: The controller delivers a path group table to each failover switch.

The failover switch meets the conditions, where the failover switch is on the active path and is on any path of the standby path, the failover switch is not the destination switch, the failover switch has at least one standby port, an active port of the failover switch corresponds to the active path, and each standby port of the failover switch corresponds to one standby path.

A network topology shown in FIG. 1 is used as an example. Assuming that S1→S3→S5→S8 in FIG. 1 is an active path, and S1→S4→S6→S8 and S1→S→S6→S8 are two standby paths of the active path, the controller determines a failover switch from switches on the active path and the standby paths. As can be seen from comparison, S1, S3, and S8 are on both the active path and the standby path. However, S8 is a destination switch. Therefore, S1 and S3 are failover switches. S1 has a standby port, a data packet may be sent to S3 using an active port of S1, and a data packet may be sent to S4 using the standby port of S1. S3 also has a standby port, a data packet may be sent to S5 using an active port of S3, and a data packet may be sent to S6 using the standby port of S3.

The controller adds a path group table for a path failure, where the path group table includes a group table identifier (group id), a group table type, and path information. The group id is used to uniquely identify the path group table such that the controller manages the path group table according to the group id. The group table type of the path group table is a path failover type, and the path failover type indicates that the group table is for a path failure, and a type of an existing failover group table is fast failover, and fast failover is for a port failure. The path information includes an identifier of the active path and standby port information of the failover switch. The standby port information includes a port number of a standby port. Optionally, the standby port information further includes a priority of the standby port. The identifier of the active path is used to notify the failover switch to perform failure detection on the active path corresponding to the identifier of the active path. The failover switch selects a destination standby port according to the standby port information, and switches a transmit port from the active port to the destination standby port, to accomplish switching of the data flow from the active path to a standby path corresponding to the destination standby port when the active path encounters a failure. The failover switch may select, according to priorities of the standby ports, a standby port having the highest priority as the destination standby port when the failover switch has multiple standby ports.

As can be seen from the foregoing description, in this embodiment of the present disclosure, each port in a path group table corresponds to one path. A failover switch detects, according to an identifier of an active path, whether the active path encounters a failure when performing path failure detection. Path switching is performed when a failure on the active path is detected. The failover switch implements path switching by means of switching of an active port to a standby port. Different from a failover group table in the prior art, the failover group table includes only standby port information of a switch, and the switch can perform only an electric failure detection on a port. The switch switches a data flow from a current port to a standby port according to the standby port information in the failover group table when a port encounters a failure. In this embodiment of the present disclosure, when the failover switch performs port switching, no failure occurs in the active port of the failover switch.

After the data flow is switched from the active path to the standby path, the standby path switch on the standby path forwards the data flow according to the flow table delivered by the controller, and each flow entry of the flow table includes three fields, a packet header field, a counter (counters), and an action. After receiving a data packet, the standby path switch performs flow matching, finds a flow entry corresponding to the data packet, and executes a corresponding operation according to the action in the flow entry.

In this embodiment, a controller determines an active path and at least one standby path for a data flow, and determines at least one failover switch from switches other than a destination switch of the active path and the standby path, and the controller delivers a path group table to each failover switch, where the path group table includes an identifier of the active path and standby port information of the failover switch such that when detecting, according to the path group table, that the active path encounters a failure, the failover switch switches a transmit port from an active port to a standby port, to accomplish switching from the active path to the standby path, thereby avoiding communication interruption.

Based on Embodiment 1, after the controller delivers the path group table to each failover switch, the controller is further configured to send a test instruction packet to a source switch, to instruct each the failover switch on the active path to detect whether the active path encounters a failure. In a specific embodiment, the test instruction packet may include an identifier of the active path, a detection period, and a failure determining period quantity M. After receiving the test instruction packet, the source switch performs failure detection. Further, the source switch sends a detection packet to an adjacent switch on the active path within each detection period. Correspondingly, the detection packet also includes the identifier of the active path, the detection period, and the failure determining period quantity M such that after receiving the detection packet, the switches on the active path forward the detection packet according to the identifier of the active path.

Figure 4:
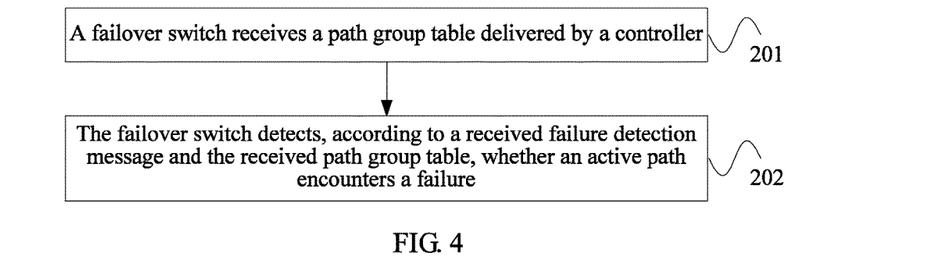
FIG. 4 is a flowchart of Embodiment 2 of a path switching method according to the present disclosure.

FIG. 4 is a flowchart of Embodiment 2 of a path switching method according to the present disclosure. The method in this embodiment is executed by a failover switch. As shown in FIG. 4, the method in this embodiment may include the following steps.

Step 201: A failover switch receives a path group table delivered by a controller.

The failover switch is a switch that is on an active path and that is on any standby path of the active path, where the active path and the standby path have a same source switch and a same destination switch, the failover switch has at least one standby port, an active port of the failover switch corresponds to the active path, and each standby port of the failover switch corresponds to one standby path.

The path group table includes an identifier of the active path. Further, the path group table may further include standby port information of the failover switch, and the standby port information includes a port number of a standby port. Optionally, the standby port information further includes a priority of the standby port.

Step 202: The failover switch detects, according to a received failure detection message and the received path group table, whether the active path encounters a failure.

In this embodiment, failure detection on the active path is triggered by the controller. The controller sends a test instruction packet to the source switch when failure detection on the active path needs to be performed. The test instruction packet includes an identifier of the active path, a detection period, and a failure determining period quantity M. After receiving the test instruction packet, the source switch sends a detection packet to an adjacent switch on the active path within each detection period. The detection packet is eventually sent to the destination switch through the active path. The detection packet also includes the identifier of the active path, the detection period, and the failure determining period quantity M such that after receiving the detection packet, switches on the active path forward the detection packet according to the identifier of the active path. If a switch on the active path is a failover switch, the failover switch not only needs to forward the packet to a next-hop switch, but also needs to generate a detection response packet and forward the detection response packet to an adjacent upstream failover switch. The destination switch does not need to forward the detection packet if a switch on the active path is a destination switch. However, the destination switch needs to generate a detection response packet and sends the detection response packet to the adjacent upstream failover switch.

It should be noted that, in a specific implementation manner, when sending the detection response packet to the adjacent upstream failover switch, the failover switch or the destination switch does not directly forward the detection response packet to the adjacent upstream failover switch, instead, the failover switch or the destination switch forwards the detection response packet according to the active path. Therefore, the detection response packet also needs to include the identifier of the active path.

In a case when the failover switch is not the source switch, detecting, by the failover switch according to a received failure detection message and the received path group table, whether the active path encounters a failure includes determining, by the failover switch, that the active path encounters a failure if the failover switch receives, within M detection periods, at least one detection packet sent by an adjacent upstream failover switch on the active path, but does not receive, within the M detection periods, a detection response packet returned by an adjacent downstream failover switch on the active path or the destination switch on the active path, where M is a positive integer greater than or equal to 1, and the detection packet carries an identifier of the active path, a detection period, and a failure determining period quantity M such that switches on the active path forward the detection packet according to the identifier of the active path.

In another case, when the failover switch is the source switch, detecting, by the failover switch according to a received failure detection message and the received path group table, whether the active path encounters a failure includes receiving, by the source switch, a test instruction packet sent by the controller, where the test instruction packet includes an identifier of the active path, a detection period, and a failure determining period quantity M, where M is a positive integer greater than or equal to 1. Next, the source switch sends a detection packet within each detection period, where the detection packet carries the identifier of the active path, the detection period, and the failure determining period quantity M such that switches on the active path forward the detection packet according to the identifier of the active path, and each failover switch can detect, according to the detection period and the failure determining period quantity M, whether the active path encounters a failure. The failover switch determines that the active path encounters a failure if the source switch does not receive, within M detection periods, a detection response packet returned by an adjacent downstream failover switch or the destination switch.

In the foregoing two cases, as long as the failover switch can receive, within M periods, at least one detection packet sent by the upstream failover switch, the failover switch considers that the active path from the source switch and the failover switch is normal. If the failover switch does not receive, within M detection periods, a detection response packet returned by an adjacent downstream failover switch, it indicates that the path between the failover switch and the adjacent downstream failover switch encounters a failure. If the failover switch does not have an adjacent downstream failover switch, when the failover switch does not receive, within the M detection periods, a detection response packet returned by the destination switch, it indicates that the path between the failover switch and the destination switch encounters a failure.

In still another case of this embodiment, the failover switch determines that the active path encounters a failure when the failover switch is not the source switch, if the failover switch does not receive, within M detection periods, a detection packet sent by an adjacent upstream failover switch, and does not receive, within the M detection periods, a detection response packet returned by an adjacent downstream failover switch or the destination switch.

In the foregoing three cases, for the former two cases, a failure occurs on a downstream path of the failover switch. Therefore, when detecting that the active path encounters a failure, the failover switch performs path switching according to the standby port information. That the failover switch performs path switching according to the standby port information includes selecting, by the failover switch, a destination standby port according to the standby port information, and switching a transmit port from an active port to the destination standby port, to accomplish switching of a data flow from the active path to a standby path corresponding to the destination standby port. For the third case, if within M detection periods, the failover switch does not receive a detection packet and does not receive a detection response packet either, it indicates that a failure also occurs on an upstream path of the failover switch, and it is meaningless for the failover switch to perform path switching. Therefore, in such a case, the failover switch does not perform path switching.

Figure 5:
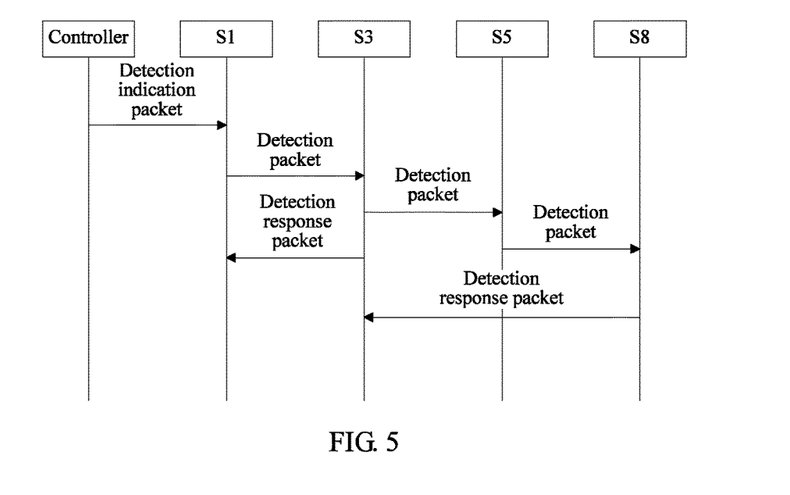
FIG. 5 is a flowchart of signaling during detection of connectivity of an active path.

Descriptions are provided below using a specific example. FIG. 5 is a flowchart of signaling during detection of connectivity of an active path. With reference to FIG. 1 and FIG. 5, the active path is S1→S3→S5→S8, the standby paths are S1→S4→S6→S8 and S1→S3→S6→S8. S1 is both a source switch and a failover switch, and S3 is a failover switch, S8 is a destination switch. After receiving a detection indication packet sent by the controller, S1 sends a detection packet within each detection period. After receiving the detection packet of S1, S3 forwards the detection packet to S5 and returns a detection response packet to S1. After receiving the detection packet forwarded by S3, S5 forwards the detection packet to S8. After receiving the detection packet sent by S5, S8 returns a detection response packet to S5. S5 forwards the detection response packet to S3. Herein, S5 merely performs transparent transmission of the packet. The detection indication packet and the detection packet both include an identifier of the active path, a detection period, a failure determining period quantity M. However, the detection indication packet and the detection packet are of different types, and the detection response packet includes the identifier of the active path. In a specific implementation manner, the detection indication packet may be ccm_start, the detection packet may be ccm_msg, and the detection response packet may be ccm_reply.

There are two failover switches in FIG. 5. S1 is used as an example. S1 sends a detection packet to S3 within each detection period, and S3 is an adjacent downstream failover switch of S1. If S1 does not receive, within M detection periods, a detection response packet returned by S3, it indicates that the active path between S1 and S3 encounters a failure, and S1 switches a transmit port from an active port that goes to S1 to a standby port that goes to S4, and sends a data packet using a standby path S 1→S4→S6→S8. S3 is used as an example. After receiving the detection packet sent by S1, S3 sends the detection packet to the destination switch S8 using S5. If S3 does not receive, within the M detection periods, a detection response packet returned by S8, it indicates that the link S3→S5→S8 encounters a failure. S3 determines that the active path encounters a failure. S3 switches the transmit port from an active port that goes to S5 to a standby port that goes to S6, and sends a data packet using a standby path S1→S3→S6→S8. If within the M detection periods, S3 does not receive the detection packet sent by S1 and does not receive a detection response packet sent by S5 either, it indicates that both links S1→S3 and S3→S5→S8 encounter a failure. In this case, if S3 performs switching, S3 can switch a data flow to only the standby path S1→S3→S6→S8. However, because the link S 1→S3 also encounters a failure, even if S3 performs switching, the path S1→S3→S6→S8 also has a failure. In such a case, S3 does not perform switching in order to reduce processing and save resources. In such a case, S1 may perform switching, and S1 may perform switching from the active path to the standby path S1→S4→S6→S8.

In this embodiment, a failover switch receives a path group table delivered by a controller, where the path group table includes an identifier of an active path, and standby port information of the failover switch. The failover switch detects, according to a received failure detection message and the received path group table, whether the active path encounters a failure, and performs path switching according to a detection result. In the method in this embodiment, the failover switch can rapidly perform switching from the active path to a standby path when detecting that the active path encounters a failure, thereby avoiding communication interruption. By means of such a path-level failure detection and switching that is performed after a failure occurs, transmission stability and efficiency of a data flow may be ensured more effectively.

Figure 6:
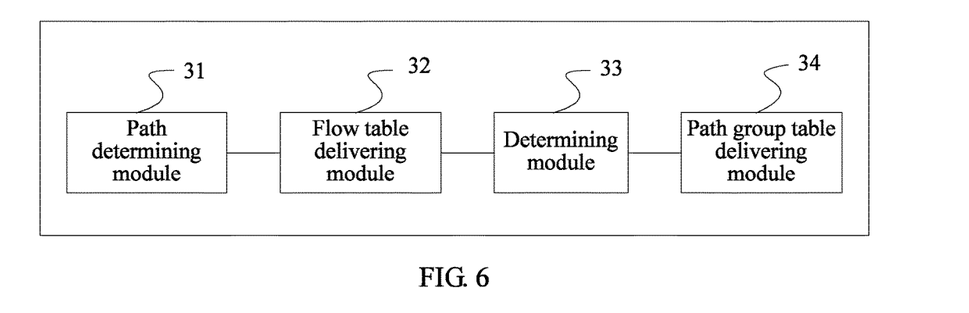
FIG. 6 is a schematic structural diagram of a controller according to an embodiment of the present disclosure.

FIG. 6 is a schematic structural diagram of a controller according to an embodiment of the present disclosure. As shown in FIG. 6, the controller in this embodiment includes a path determining module 31, a flow table delivering module 32, a determining module 33, and a path group table delivering module 34.

The path determining module 31 is configured to determine an active path and at least one standby path of a data flow, where the active path and the standby path have a same source switch and a same destination switch.

The flow table delivering module 32 is configured to deliver a flow table to a standby path switch, where the standby path switch is on the standby path and is not on the active path such that after the data flow is switched from the active path to the standby path, the standby path switch forwards the data flow according to the flow table, where the flow table includes an indication indicating that there is no hit of a flow entry in the flow table and the flow table is still not to be deleted.

The determining module 33 is configured to determine a failover switch according to the conditions, where the failover switch is on the active path and is on any path of the standby path, the failover switch is not the destination switch, the failover switch has at least one standby port, an active port of the failover switch corresponds to the active path, and each standby port of the failover switch corresponds to one standby path.

The path group table delivering module 34 is configured to deliver a path group table to each failover switch, where the path group table includes an identifier of the active path and standby port information such that when detecting, according to the identifier of the active path, that the active path encounters a failure, each failover switch performs path switching according to the standby port information.

Optionally, the indication indicating that there is no hit of a flow entry in the flow table and the flow table is still not to be deleted includes that a hard time-out and an idle time-out of the flow table are both set to 0.

Further, the controller in this embodiment may further include a sending module configured to send a test instruction packet to the source switch, to instruct each failover switch on the active path to detect whether the active path encounters a failure. The test instruction packet includes the identifier of the active path, a detection period, and a failure determining period quantity M.

The controller in this embodiment may be configured to execute the method shown in FIG. 3 and/or FIG. 5, and has similar specific implementation manners and technical effects, and details are no longer described herein.

It should be noted that, the foregoing division of functional modules is merely one of the implementation manners. In a specific implementation manner, a person skilled in the art may perform different division of functional modules according to a specific case with reference to the foregoing description of the embodiments to execute the foregoing method in order to accomplish the functions of the present disclosure and to achieve the effects of the present disclosure. In a specific implementation manner, the foregoing modules may be software modules, and these software modules are executed using a hardware device, for example, a computer processor, a central processing unit (CPU), or a logic circuit, that has a software executing function to perform the method described above. The foregoing software modules may also be executed by hardware components, for example, by corresponding hardware components in a controller in an SDN network architecture. With reference to the case of the foregoing embodiments, a person skilled in the art may make corresponding changes (such changes may be changes of the form of software, firmware, or hardware) to corresponding hardware components in the controller according to the description of the embodiments or add a new hardware component to accomplish the functions and effects of the present disclosure.

Figure 7:
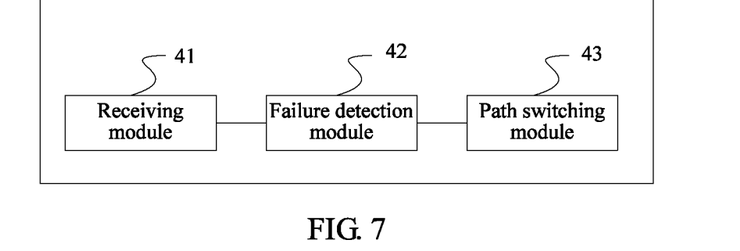
FIG. 7 is a schematic structural diagram of a failover switch according to an embodiment of the present disclosure.

FIG. 7 is a schematic structural diagram of a failover switch according to an embodiment of the present disclosure. The failover switch is on an active path and is on any standby path of the active path, the active path and the standby path have a same source switch and a same destination switch, the failover switch has at least one standby port, an active port of the failover switch corresponds to the active path, and each standby port of the failover switch corresponds to one standby path. As shown in FIG. 7, the failover switch provided in this embodiment includes a receiving module 41 and a failure detection module 42.

The receiving module 41 is configured to receive a path group table delivered by a controller, where the path group table includes an identifier of the active path and standby port information of the failover switch.

The failure detection module 42 is configured to detect, according to a received failure detection message and the received path group table, whether the active path encounters a failure.

In a case, when the failover switch is not the source switch, the receiving module 41 is further configured to receive a detection packet sent by an adjacent upstream failover switch, and receive a detection response packet returned by an adjacent downstream failover switch on the active path or the destination switch on the active path, where the detection packet carries an identifier of the active path, a detection period, and a failure determining period quantity M such that switches on the active path forward the detection packet according to the identifier of the active path. The failover switch further includes a sending module (not shown) configured to forward the detection packet. The failure detection module 42 is further configured to determine that the active path encounters a failure if the receiving module 41 receives, within M detection periods, at least one detection packet sent by an adjacent upstream failover switch on the active path, but does not receive, within the M detection periods, a detection response packet returned by the adjacent downstream failover switch or the destination switch, where M is a positive integer greater than or equal to 1. The detection response packet is sent to the adjacent upstream failover switch when each failover switch and the destination switch receive the detection packet.

In another case, when the failover switch is the source switch, the receiving module 41 is further configured to receive a test instruction packet sent by the controller, and a detection response packet returned by an adjacent downstream failover switch or the destination switch, where the test instruction packet includes an identifier of the active path, a detection period, and a failure determining period quantity M, where M is a positive integer greater than or equal to 1. The failover switch further includes a sending module configured to send a detection packet within each detection period, where the detection packet carries the identifier of the active path, the detection period, and the failure determining period quantity M such that switches on the active path forward the detection packet according to the identifier of the active path. The failure detection module 42 is further configured to determine that the active path encounters a failure if the receiving module 41 does not receive, within M detection periods, a detection response packet returned by the adjacent downstream failover switch or the destination switch. The detection response packet is sent to an adjacent upstream failover switch when each failover switch and the destination switch receive the detection packet.

In the foregoing two cases, the failover switch further includes a path switching module 43 configured to perform path switching according to the standby port information when the failure detection module 42 detects that the active path encounters a failure. The path switching module 43 is further configured to select a destination standby port according to the standby port information, and switch a transmit port from the active port to the destination standby port, to accomplish switching of the data flow from the active path to a standby path corresponding to the destination standby port.

In still another case, when the failover switch is not the source switch, the receiving module 41 is further configured to receive a detection packet sent by an adjacent upstream failover switch on the active path, and receive a detection response packet returned by an adjacent downstream failover switch on the active path or the destination switch on the active path, where the detection packet carries an identifier of the active path, a detection period, and a failure determining period quantity M such that switches on the active path forward the detection packet according to the identifier of the active path. The failure detection module 42 is further configured to determine that the active path encounters a failure if the receiving module 41 does not receive, within M detection periods, the detection packet sent by the adjacent upstream failover switch, and does not receive, within the M detection periods, a detection response packet returned by the adjacent downstream failover switch or the destination switch, where M is a positive integer greater than or equal to 1. Certainly, the failover switch further includes a sending module configured to send the detection packet.

In the third case, when the failure detection module detects that the active path encounters a failure, the path switching module 43 of the failover switch skips performing path switching in order to reduce processing in the failover switch and save resources.

The failover switch in this embodiment may be configured to perform the methods shown in FIG. 4 and/or FIG. 5, and has similar specific implementation manners and technical effects, and details are no longer described herein.

It should be noted that, the foregoing division of functional modules is merely one of the implementation manners. In a specific implementation manner, a person skilled in the art may perform different division of functional modules according to a specific case with reference to the foregoing description of the embodiments to execute the foregoing method in order to accomplish the functions of the present disclosure and to achieve the effects of the present disclosure. In a specific implementation manner, the foregoing modules may be software modules, and these software modules are executed using a hardware device, for example, a computer processor, a CPU, or a logic circuit, that has a software executing function to perform the method described above. The foregoing software modules may also be executed by hardware components, for example, by corresponding hardware components in a switch in an SDN network architecture. With reference to the case of the foregoing embodiments, a person skilled in the art may make corresponding changes (such changes may be changes of the form of software, firmware, or hardware) to corresponding hardware components in the switch according to the description of the embodiments or add a new hardware component to accomplish the functions and effects of the present disclosure.

Figure 8:
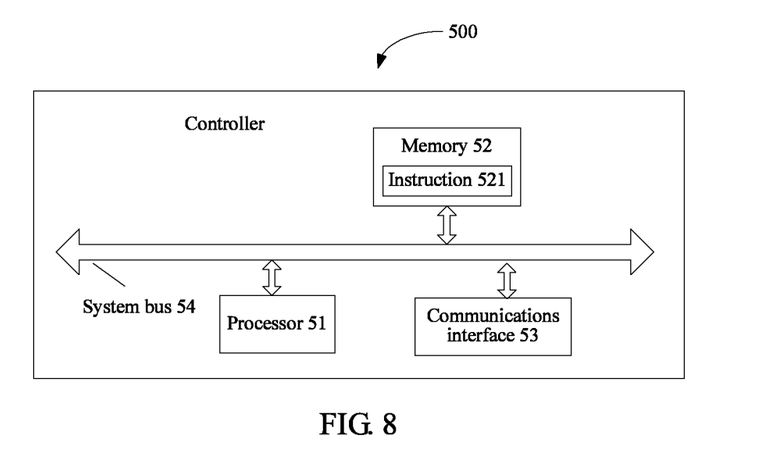
FIG. 8 is a schematic structural diagram of another controller according to an embodiment of the present disclosure.

FIG. 8 is a schematic structural diagram of another controller according to an embodiment of the present disclosure. As shown in FIG. 8, a controller 500 in this embodiment includes a processor 51, a memory 52, a communications interface 53, and a system bus 54. The processor 51, the memory 52, and the communications interface 53 may be connected to each other and communicate with each other using the bus 54. The processor 51 may be a CPU, an application-specific integrated circuit (ASIC), or the like. The memory 52 may include an entity that has a storage function, such as a random access memory (RAM), a read-only memory (ROM), and a disk. The memory 52 is configured to store a computer executable instruction 521. The processor 51 is configured to execute the computer executable instruction 521, to execute the foregoing various embodiments corresponding to FIG. 3 and FIG. 4 and a combination thereof. In one specific embodiment, the instruction is executed by the processor 51 to perform the following method which includes the operations of determining an active path and at least one standby path of a data flow, where the active path and the standby path have a same source switch and a same destination switch, after the active path and the standby path are determined, delivering, by the controller 500, a flow table to a standby path switch using the communications interface 53, where the standby path switch is on the standby path and is not on the active path such that after the data flow is switched from the active path to the standby path, the standby path switch forwards the data flow according to the flow table, where the flow table includes an indication indicating that there is no hit of a flow entry in the flow table and the flow table is still not to be deleted, and determining a failover switch according to the conditions, the failover switch is on the active path and is on any path of the standby path, the failover switch is not the destination switch, the failover switch has at least one standby port, an active port of the failover switch corresponds to the active path, and each standby port of the failover switch corresponds to one standby path; after the failover switch is determined, delivering, by the controller 500, a path group table to each failover switch using the communications interface 53, where the path group table includes an identifier of the active path and standby port information such that when detecting, according to the identifier of the active path, that the active path encounters a failure, each failover switch performs path switching according to the standby port information.

Optionally, the indication indicating that there is no hit of a flow entry in the flow table and the flow table is still not to be deleted includes that a hard-time-out and an idle-time-out of the flow table are both set to 0.

In this embodiment, the communications interface 53 is further configured to send a test instruction packet to the source switch, to instruct each failover switch on the active path to detect whether the active path encounters a failure. The test instruction packet includes the identifier of the active path, a detection period, and a failure determining period quantity M.

When performing the foregoing methods shown in FIG. 3 and FIG. 5, the controller 500 in this embodiment has a similar specific implementation manner and a technical effect, and details are no longer described herein.

Figure 9:
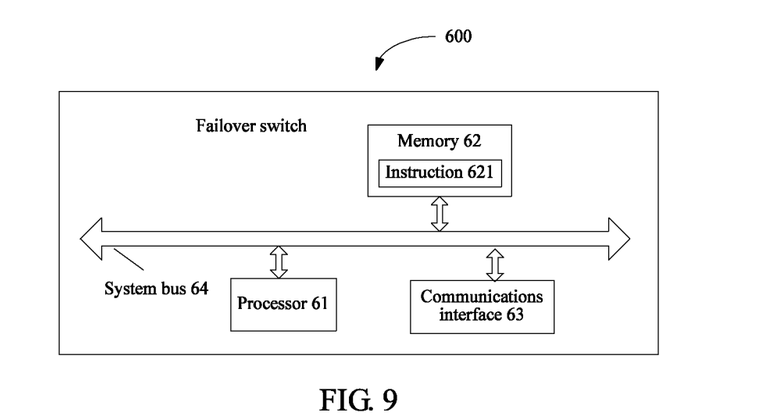
FIG. 9 is a schematic structural diagram of another failover switch according to an embodiment of the present disclosure.

FIG. 9 is a schematic structural diagram of another failover switch according to an embodiment of the present disclosure. The failover switch in this embodiment is on an active path and is on any standby path of the active path, the active path and the standby path have a same source switch and a same destination switch, the failover switch has at least one standby port, an active port of the failover switch corresponds to the active path, and each standby port of the failover switch corresponds to one standby path. As shown in FIG. 9, a failover switch 600 in this embodiment includes a processor 61, a memory 62, a communications interface 63, and a system bus 64. The processor 61, the memory 62, and the communications interface 63 may be connected to each other and communicate with each other using the bus 64. The memory 62 is configured to store a computer executable instruction 621. The processor 61 is configured to execute the computer executable instruction 621.

The communications interface 63 is configured to communicate with a controller and an adjacent switch, and may be configured to receive a message delivered by the controller and the adjacent switch, and send a message to the adjacent switch. Further, the communications interface 63 is configured to receive a path group table delivered by the controller, where the path group table includes an identifier of the active path and standby port information of the failover switch.

The processor 61 detects, according to a failure detection message and the path group table that are received by the communications interface 63, whether the active path encounters a failure.

In a case when the failover switch is not the source switch, the communications interface 63 is configured to receive a detection packet sent by an adjacent upstream failover switch, and receive a detection response packet returned by an adjacent downstream failover switch on the active path or the destination switch on the active path, where the detection packet carries the identifier of the active path, a detection period, and a failure determining period quantity M such that switches on the active path forward the detection packet according to the identifier of the active path. The communications interface 63 is further configured to forward the detection packet. The processor 61 is further configured to determine that the active path encounters a failure if the communications interface 63 receives, within M detection periods, at least one detection packet sent by an adjacent upstream failover switch on the active path, but does not receive, within the M detection periods, a detection response packet returned by the adjacent downstream failover switch or the destination switch, where M is a positive integer greater than or equal to 1. The detection response packet is sent to the adjacent upstream failover switch when each failover switch and the destination switch receive the detection packet.

In another case, when the failover switch is the source switch, the communications interface 63 is configured to receive a test instruction packet sent by the controller, and a detection response packet returned by an adjacent downstream failover switch or the destination switch, where the test instruction packet includes the identifier of the active path, a detection period, and a failure determining period quantity M, where M is a positive integer greater than or equal to 1. The communications interface 63 is further configured to send a detection packet within each detection period, where the detection packet carries the identifier of the active path, the detection period, and the failure determining period quantity M such that switches on the active path forward the detection packet according to the identifier of the active path. The processor 61 is further configured to determine that the active path encounters a failure if the receiving module does not receive, within M detection periods, a detection response packet returned by the adjacent downstream failover switch or the destination switch. The detection response packet is sent to an adjacent upstream failover switch when each failover switch and the destination switch receive the detection packet.

In the foregoing two cases, when the processor 61 detects that the active path encounters a failure, the processor 61 is further configured to perform path switching according to the standby port information. That the processor 61 performs path switching according to the standby port information includes selecting a destination standby port according to the standby port information, and switching a transmit port from the active port to the destination standby port, to accomplish switching of the data flow from the active path to a standby path corresponding to the destination standby port.

In still another case, when the failover switch is not the source switch, the communications interface 63 is configured to receive a detection packet sent by an adjacent upstream failover switch on the active path, and receive a detection response packet returned by an adjacent downstream failover switch on the active path or the destination switch on the active path, where the detection packet carries the identifier of the active path, a detection period, and a failure determining period quantity M such that switches on the active path forward the detection packet according to the identifier of the active path. The communications interface 63 is further configured to forward the detection packet when the detection packet is received. The processor 61 is further configured to determine that the active path encounters a failure if the communications interface 63 does not receive, within M detection periods, the detection packet sent by the adjacent upstream failover switch, and does not receive, within the M detection periods, a detection response packet returned by the adjacent downstream failover switch or the destination switch, where M is a positive integer greater than or equal to 1. In such a case, when the processor 61 detects that the active path encounters a failure, path switching is skipped.

The failover switch in this embodiment may be configured to perform the method shown in FIG. 4 or FIG. 5, and has a similar specific implementation manner and a similar technical effect, and details are no longer described herein.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A path switching method, comprising:
   determining, by a controller, an active path and at least one standby path of a data flow, wherein the active path and the standby path have a same source switch and a same destination switch;
   delivering, by the controller, a flow table to a standby path switch, wherein the standby path switch is on the standby path and is not on the active path such that after the data flow is switched from the active path to the standby path, the standby path switch forwards the data flow according to the flow table, and wherein the flow table comprises an indication indicating that there is no hit of a flow entry in the flow table and the flow table is still not to be deleted; and
   delivering, by the controller, a path group table to each failover switch, wherein the path group table comprises an identifier of the active path and standby port information such that when detecting, according to the identifier of the active path, that the active path encounters a failure, each failover switch performs path switching according to the standby port information, wherein the failover switch is a switch that is on the active path and that is on any path of the standby path, wherein the failover switch is not the destination switch, wherein the failover switch has at least one standby port, wherein an active port of the failover switch corresponds to the active path, and wherein each standby port of the failover switch corresponds to one standby path.

2. The method according to claim 1, wherein the indication indicating that there is no hit of the flow entry in the flow table and the flow table is still not to be deleted further comprises that a hard time-out and an idle time-out of the flow table are both set to 0.

3. The method according to claim 1, wherein after delivering the path group table to each failover switch, the method further comprises sending, by the controller, a test instruction packet to the source switch, to instruct each failover switch on the active path to detect whether the active path encounters the failure.

4. The method according to claim 3, wherein the test instruction packet comprises the identifier of the active path, a detection period, and a failure determining period quantity M, and wherein M is a positive integer greater than or equal to 1.

5. A path switching method, wherein the path switching method is executed by a failover switch, wherein the failover switch is a switch that is on an active path and that is on any standby path of the active path, wherein the active path and the standby path have a same source switch and a same destination switch, wherein the failover switch has at least one standby port, wherein an active port of the failover switch corresponds to the active path, wherein each standby port of the failover switch corresponds to one standby path, and wherein the method comprises:
   receiving, by the failover switch, a path group table delivered by a controller, wherein the path group table comprises an identifier of the active path;
   detecting, by the failover switch according to a received failure detection message and the received path group table, whether the active path encounters a failure when the failover switch is not the source switch by:
      receiving, by the failover switch within M detection periods, at least one detection packet sent by an adjacent upstream failover switch on the active path, wherein the detection packet carries the identifier of the active path, a detection period, and a failure determining period quantity M;
      sending, by the failover switch, a detection response packet to the adjacent upstream failover switch according to the identifier of the active path;
      forwarding the detection packet to an adjacent downstream failover switch on the active path or the destination switch on the active path; and
      determining, by the failover switch, that the active path encounters the failure when the failover switch does not receive, within the M detection periods, the detection response packet returned by the adjacent downstream failover switch or the destination switch, wherein M is a positive integer greater than or equal to 1.

6. The method according to claim 5, wherein the path group table further comprises standby port information of the failover switch, and wherein the method further comprises performing, by the failover switch, path switching according to the standby port information when detecting that the active path encounters the failure.

7. The method according to claim 6, wherein performing the path switching according to the standby port information comprises:
   selecting, by the failover switch, a destination standby port according to the standby port information; and
   switching a transmit port from the active port to the destination standby port, to accomplish switching of a data flow from the active path to a standby path corresponding to the destination standby port.

8. The method according to claim 5, wherein when the failover switch is not the source switch, detecting whether the active path encounters the failure comprises determining, by the failover switch, that the active path encounters a failure when the failover switch does not receive, within M detection periods, a detection packet sent by an adjacent upstream failover switch, and does not receive, within the M detection periods, a detection response packet returned by an adjacent downstream failover switch or the destination switch, wherein M is a positive integer greater than or equal to 1, and wherein the detection packet carries the identifier of the active path, a detection period, and a failure determining period quantity M such that switches on the active path forward the detection packet according to the identifier of the active path.

9. The method according to claim 8, wherein the method further comprises skipping, by the failover switch, performing path switching.

10. A controller, comprising:
a memory; and
a processor coupled to the memory and configured to:
determine an active path and at least one standby path of a data flow, wherein the active path and the standby path have a same source switch and a same destination switch;
deliver a flow table to a standby path switch, wherein the standby path switch is on the standby path and is not on the active path such that after the data flow is switched from the active path to the standby path, the standby path switch forwards the data flow according to the flow table, wherein the flow table comprises an indication indicating that there is no hit of a flow entry in the flow table and the flow table is still not to be deleted;
determine a failover switch according to the conditions of the failover switch is on the active path and is on any path of the standby path, the failover switch is not the destination switch, the failover switch has at least one standby port, an active port of the failover switch corresponds to the active path, and each standby port of the failover switch corresponds to one standby path; and
deliver a path group table to each failover switch, wherein the path group table comprises an identifier of the active path and standby port information such that when detecting, according to the identifier of the active path, that the active path encounters a failure, each failover switch performs path switching according to the standby port information.

11. The controller according to claim 10, wherein the indication indicating that there is no hit of the flow entry in the flow table and the flow table is still not to be deleted comprises that a hard time-out and an idle time-out of the flow table are both set to 0.

12. The controller according to claim 10, wherein the processor is further configured to send a test instruction packet to the source switch, to instruct each failover switch on the active path to detect whether the active path encounters the failure.

13. The controller according to claim 12, wherein the test instruction packet comprises the identifier of the active path, a detection period, and a failure determining period quantity M, and wherein M is a positive integer greater than or equal to 1.

14. A failover switch, wherein the failover switch is a switch that is on an active path and that is on any standby path of the active path, wherein the active path and the standby path have a same source switch and a same destination switch, wherein the failover switch has at least one standby port, wherein an active port of the failover switch corresponds to the active path, wherein each standby port of the failover switch corresponds to one standby path, and wherein the failover switch comprises:
a receiver configured to receive a path group table delivered by a controller, wherein the path group table comprises an identifier of the active path;
a processor coupled to the receiver and configured to detect, according to a received failure detection message and the received path group table, whether the active path encounters a failure,
wherein when the failover switch is the source switch, the receiver is further configured to receive a test instruction packet sent by the controller and a detection response packet returned by an adjacent downstream failover switch or the destination switch, wherein the test instruction packet comprises the identifier of the active path, a detection period, and a failure determining period quantity M, and wherein M is a positive integer greater than or equal to 1; and
a transmitter coupled to the processor and configured to send a detection packet to the adjacent downstream failover switch within each detection period according to the identifier of the active path, wherein the detection packet carries the identifier of the active path, the detection period, and the failure determining period quantity M, and
wherein the processor is further configured to determine that the active path encounters the failure when the receiver does not receive, within M detection periods, the detection response packet returned by the adjacent downstream failover switch or the destination switch.

* * * * *